United States Patent [19]

Storwick

[11] 4,428,229
[45] Jan. 31, 1984

[54] MEANS FOR ESTABLISHING TIMING IN DIESEL ENGINES USING MICROWAVE INFORMATION

[75] Inventor: Robert M. Storwick, Rochester, Mich.

[73] Assignee: General Motors Corporation, Detroit, Mich.

[21] Appl. No.: 383,821

[22] Filed: Jun. 1, 1982

[51] Int. Cl.³ ............................................ G01M 15/00
[52] U.S. Cl. ................................... 73/119 A; 73/117.3
[58] Field of Search ........................... 73/119 A, 117.3

[56] References Cited

U.S. PATENT DOCUMENTS

| | | | |
|---|---|---|---|
| 3,589,177 | 6/1971 | Merlo | 73/116 |
| 3,703,825 | 11/1972 | Merlo | 73/116 |
| 4,331,029 | 5/1982 | Wilson | 73/117.3 |
| 4,337,648 | 7/1982 | Gillespie | 73/119 A X |
| 4,373,384 | 2/1983 | Olson et al. | 73/119 A |

OTHER PUBLICATIONS

Merlo, A. L., Combustion Chamber Investigation . . . Resonances, IEEE Transactions on Industrial Electronics and Control Instrumentation, Apr. 1970.

Lienesch, J. H. et al., Using Microwaves to Phase Cylinder . . . Position, SAE paper 790103, Feb. 1979.

*Primary Examiner*—Jerry W. Myracle
*Attorney, Agent, or Firm*—C. R. Meland

[57] ABSTRACT

A method and apparatus for determining diesel engine fuel injection timing. While a diesel engine is running a microwave signal is supplied to the combustion chamber thereof and the reflected signal is detected. The combustion chamber is supplied with fuel by an outwardly opening poppet type injector. The reflected microwave signal has an asymmetric portion which is produced when the injector poppet opens to inject fuel. The method and system of this invention detects the occurrence of the asymmetric waveform and relates it to the top dead center position of the engine.

6 Claims, 6 Drawing Figures

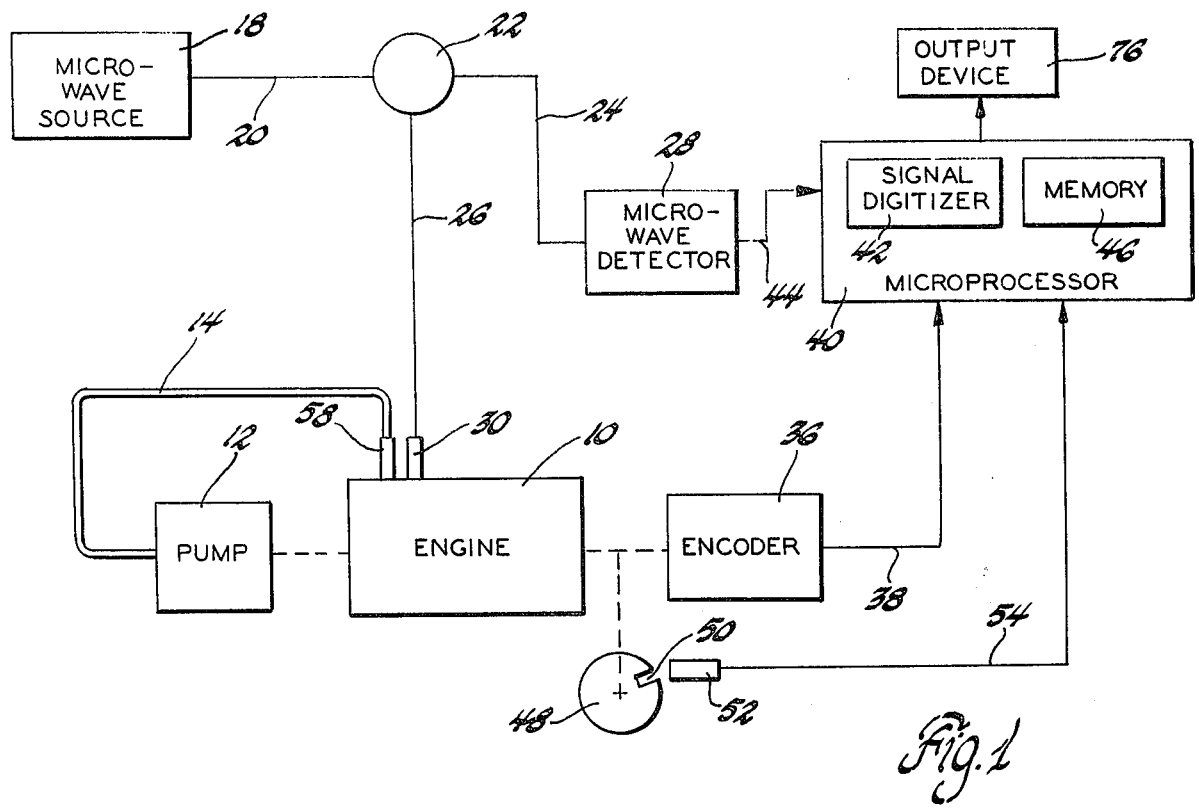
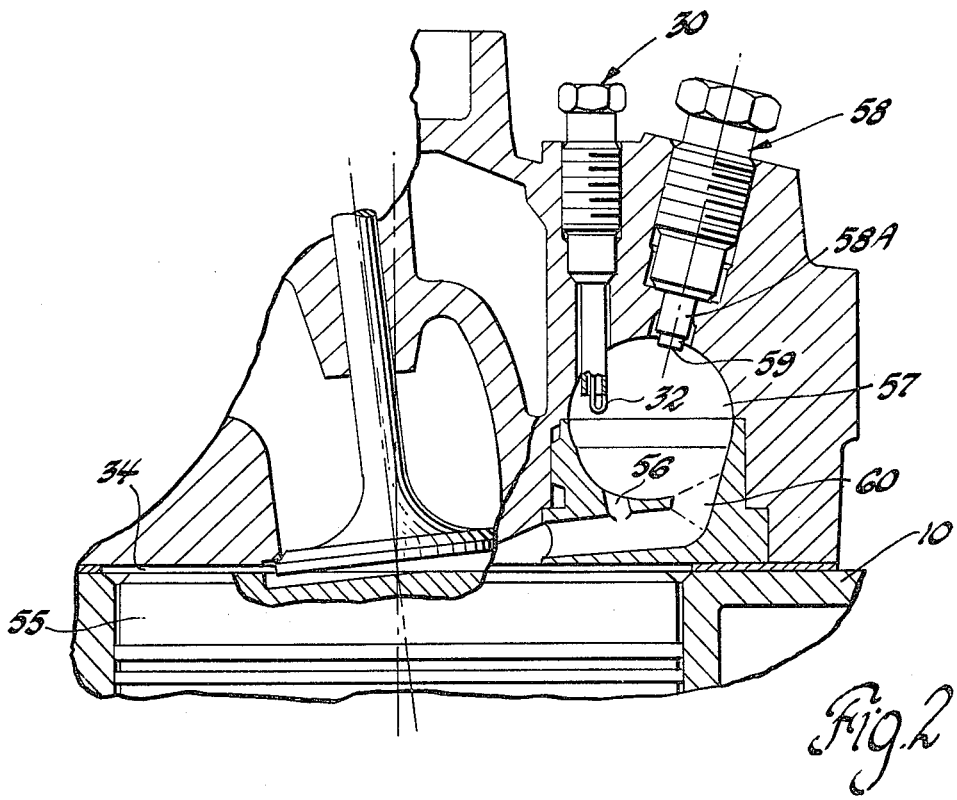

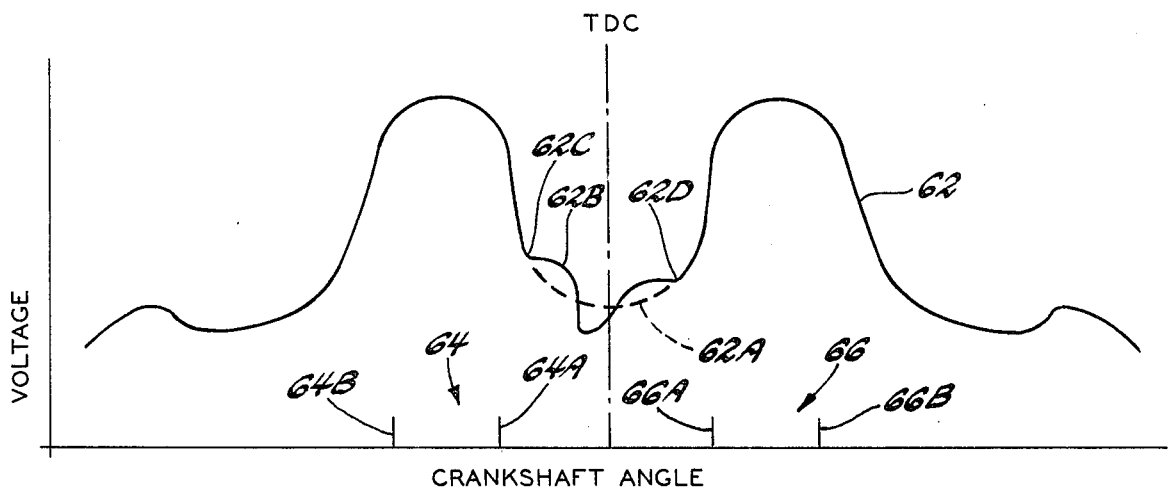
Fig. 3
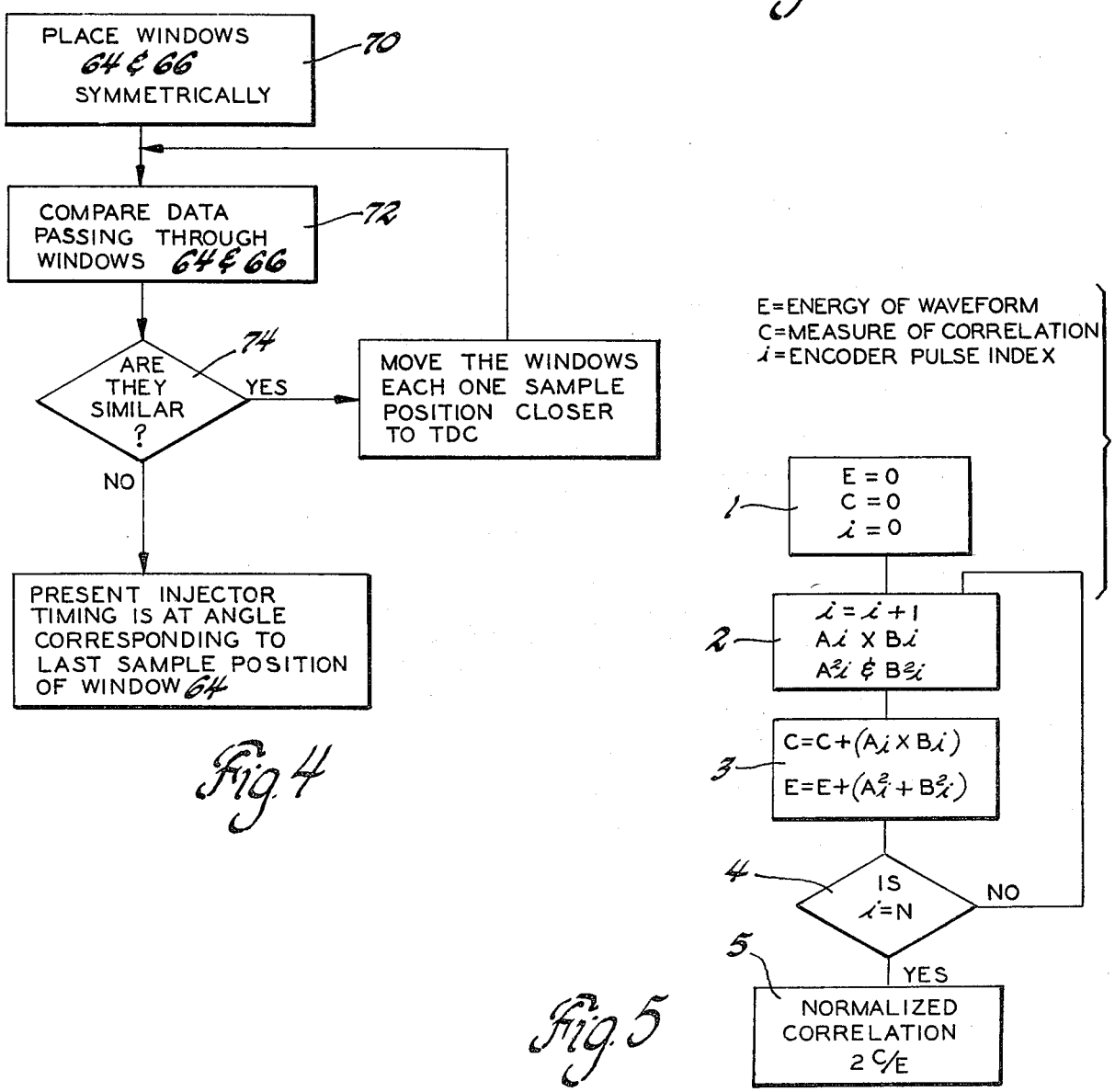
Fig. 4
Fig. 5

MEANS FOR ESTABLISHING TIMING IN DIESEL ENGINES USING MICROWAVE INFORMATION

This invention relates to a method and apparatus for determining the crankshaft angle of occurrence of fuel injection into a diesel engine and more particularly for determining the crank angle at which the poppet injector of a diesel engine fuel supply system opens to inject fuel into a combustion chamber of a diesel engine.

One known method of determining when fuel is injected into the combustion chamber of a diesel engine is to sense a pressure change in the fuel line leading to the injector. Another known method of determining diesel engine timing is to utilize a luminosity detector which detects the combustion event within the engine.

In contrast to the just-mentioned methods of detecting fuel injection in a diesel engine, it is an object of this invention to provide injection timing information by supplying the combustion chamber with a microwave signal and then detecting a change in wave shape of the reflected microwave signal which is due to the opening of the poppet injector valve. In carrying this object forward the combustion chamber is supplied with a microwave signal and as the piston moves the reflected microwave signal is detected. The reflected signal is generally symmetrical about a top dead center position of the piston but as the fuel injector poppet valve opens the microwave signal exhibits an asymmetrical portion offset from top dead center. In order to detect the point of occurrence of this asymmetrical portion in relation to crankshaft angle the reflected waveform is digitized in step with changing crankshaft angle by means of a crankshaft driven encoder that develops signal pulses at predetermined uniform crankshaft angles. The amplitude of the reflected waveform is digitized such that the digital representation of a given crankshaft pulse represents the amplitude of the reflected waveform when that pulse occurred. This information is stored and then processed by a pair of spaced windows that are utilized to sample the digitized crankshaft related data. The windows can be initially set outboard of top dead center such that they detect symmetrical portions of the waveform and then shifted toward each other until the data detected by the windows shift from a symmetrical to asymmetrical relationship. The amount of shift corresponds to the point of fuel injection relative to top dead center. As an alternative the windows may be placed edge to edge at a top dead center position and then moved outwardly until a transition is detected between asymmetric and symmetric data to thereby again provide information as to the point of injection relative to top dead center.

IN THE DRAWINGS

FIG. 1 is a schematic illustration of the overall system of this invention;

FIG. 2 is a view of a combustion chamber of a diesel engine illustrating the microwave probe and poppet type fuel injector;

FIG. 3 illustrates a detected reflected waveform from the cylinder of a diesel engine as it is running relating waveform voltage amplitude to crankshaft angle;

FIG. 4 is a flow chart of the operation of the microprocessor illustrated in FIG. 1 during a data processing procedure;

FIG. 5 is a flow chart illustrating a data correlation procedure; and

Figure 6:
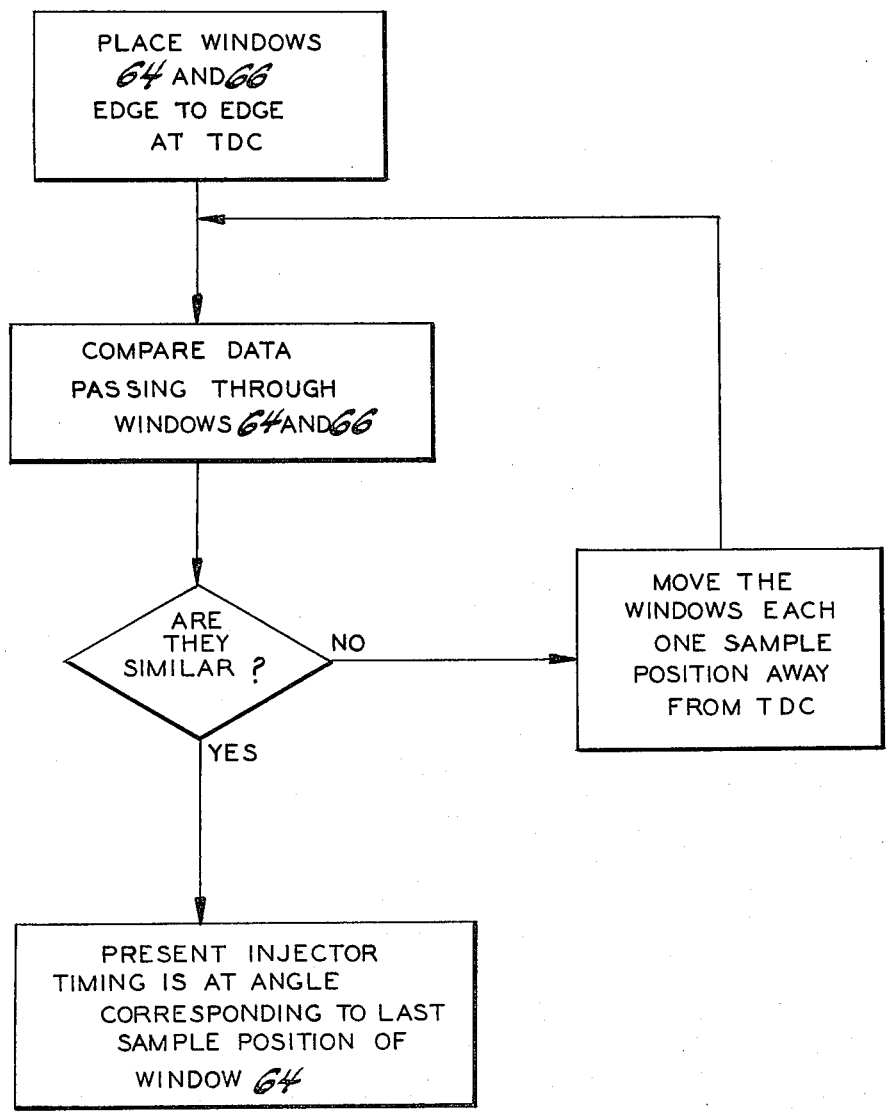
FIG. 6 is another flow chart illustrating an alternative method of detecting fuel injection relative to top dead center.

Referring now to the drawings, and more particularly to FIG. 1, reference numeral 10 designates a diesel engine which drives a conventional fuel injection pump 12. The output of the injection pump 12 is connected to a fuel feed line 14 that injects fuel into a combustion chamber of the engine by a poppet type injector 58. A plurality of additional fuel injectors and fuel lines are utilized which are not illustrated for feeding respective cylinders of the engine. Injection timing can be set in a conventional manner by adjusting the pump housing of pump 12 relative to the engine.

One of the cylinders of the engine 10 is supplied with a microwave signal. This is accomplished by a conventional microwave signal source 18 coupled to a coaxial cable 20. The cable 20 is connected to a conventional three port circulator designated by reference numeral 22. The other two ports of the circulator are connected respectively with coaxial cables 24 and 26. The cable 24 is connected to any known type of microwave detector 28, operating as a square law detector, which detects the signal applied to it from cable 24. The coaxial cable 26 is connected to a probe 30 illustrated in FIG. 2 which comprises a loop antenna element 32 that is operative to couple microwave energy to a combustion chamber 34 of the engine.

The crankshaft of the engine 10 mechanically drives an encoder 36 which provides output pulses on conductor 38 that represent crankshaft position. The encoder 36 can take any conventional form that provides a reference pulse at a certain crankshaft position and uniformly displaced position pulses thereafter that are synchronized with crankshaft position. Since the position pulses are uniformly spaced, that is a certain number of pulses occur for a given angular rotation of the crankshaft, the pulses can be counted from a reference position to determine crankshaft angle relative to the reference position. The conductor 38 is connected to a digital computer comprising a microprocessor generally designated by reference numeral 40. The microprocessor includes, among other things, a conventional signal digitizer designated by reference numeral 42 which is coupled to line 44 or the output of microwave detector 28. The microprocessor 40 further has a memory designated by reference numeral 46. The microprocessor can be of any conventional type and may be, for example, a Motorola 6800.

The crankshaft of the engine, in addition to driving the encoder 36, drives a rotatable circular disk 48 having a slot 50. The slot 50 cooperates with a conventional magnetic pickup coil 52 such that when the slot 50 passes the pickup 52 a pulse is generated and applied to conductor 54 in a known manner. The conductor 54 is connected to the microprocessor 40. As an alternative, the slot 50 may be disposed between a source of light and some light sensitive device such as a photo transistor to develop a pulse in a known manner. With this arrangement, when slot 50 is in a certain angular position it permits light to be coupled between the source and light sensitive device.

Referring now more particularly to FIG. 2, one piston 55 and cylinder of the diesel engine 10 is illustrated. The diesel engine is of a type disclosed in U.S. Pat. No. 4,270,499 in that it has a pre-combustion chamber 57 connected to combustion chamber 34 by passages 56 and 60. The microwave probe 30 has an externally threaded portion threaded into the glow plug opening of the engine. When using the test method of this invention the glow plug is removed and the microwave probe is threaded into the glow plug opening. The antenna element 32 of the probe is located in pre-combustion chamber 57. The frequency of the microwave signal is high enough, as compared to the size of openings connecting the pre-combustion chamber 57 and combustion chamber 34 that the openings readily pass the microwave signal between chamber 34 and pre-combustion chamber 57.

The pre-combustion chamber 57 is supplied with fuel by a conventional fuel injection nozzle 58 of the outward opening poppet valve type. This nozzle has a movable valve member having a pintle portion 59 which moves out of the housing 58A and into chamber 57 when fuel is injected into pre-combustion chamber 57. As is known to those skilled in the art the pintle portion 59 is biased to a retracted position within housing 58A until the pump 12 applies pressure to line 14 of sufficient magnitude to open the injection valve and move the pintle portion 59 outwardly of housing 58A. The end of pintle 59 is shown in FIG. 2 in its projected fuel injecting position.

When the end of pintle 59 moves out of injection housing 58A and into pre-combustion chamber 57 the microwave signal or energy applied to pre-combustion chamber 57 is perturbed by the now protruding end of the pintle 59 and the shape of the reflected microwave signal changes in a manner more fully described hereinafter.

Assuming now that the diesel engine is running and being supplied with a microwave signal by the system shown in FIG. 1, a reflected microwave signal is applied to and detected by detector 28. The detected waveform, which is applied to line 44, is shown in FIG. 3 and has an amplitude that is related to piston and crankshaft position. The top dead center position of piston 55 is shown in FIG. 3 as a dotted line. This reflected signal is designated by reference numeral 62 and has a dotted portion 62A which illustrates the shape of the reflected signal if the poppet valve of injection nozzle 58 were closed, that is, with pintle 59 retracted into housing 58A. It can be seen, from FIG. 3, that the waveform 62, including portion 62A, is generally symmetrical about a top dead center position of the piston 55 and its variation in amplitude is due to change in piston position. Thus, as the piston moves up and down in the engine cylinder the reflected waveform has an amplitude related to instantaneous piston position.

When the poppet valve of nozzle 58 opens to project pintle 59 into chamber 57 the waveform 62 changes in an area near top dead center such that the dotted portion 62A no longer exists. Instead the mid portion 62B of waveform 62, between points 62C and 62D, now becomes asymmetric as shown. As will be more fully explained hereinafter the processing method of this invention is capable of detecting the beginning 62C of the occurrence of the waveform 62B and is capable of utilizing this information to determine the point of fuel injection relative to top dead center.

In utilizing the system and method of this invention top dead center can be detected by determining the point of symmetry of the waveform 62 or can be determined mechanically. Where a mechanical arrangement is utilized for determining top dead center the engine can be mechanically gauged to determine the top dead center point and the disk 48 and pickup 52 are so positioned that slot 50 passes the pickup 52 when piston 55 is at top dead center. A signal will now be applied to the microprocessor 40 via line 54 when the piston reaches top dead center. The substantially simultaneous occurrence of an encoder output pulse (line 38) is recorded by microprocessor 40 as indicating top dead center. On the other hand, if it is desired to determine top dead center by determining the point of symmetry of the waveform 62 the disk 48 can be connected to the crankshaft in a position that roughly corresponds to the top dead center position of the engine, that is the slot 50 passes the pickup 52 at a position that is known to be, for example, within 10 or 20 crankshaft degrees in advance of top dead center. This is more fully described hereinafter.

In utilizing the system and method of this invention the engine is run with fuel supplied thereto and the engine is supplied with microwave energy and the reflected waveform is detected by detector 28. The reflected signal passses to detector 28 via line 26, circulator 22 and line 24. The reflected waveform 62 and the encoder pulses from encoder 36 are applied to the signal digitizer 42. The signal digitizer 42 provides a digital representation of the amplitude of the reflected microwave signal 62 at each encoder pulse. This information is stored in the memory 46 such that each addressable memory location represents a crankshaft position as determined by an encoder pulse and a digital representation of the amplitude of the waveform 62 for a given encoder pulse. In digitizing this information the pulse developed on line 54, whether it be a top dead center pulse or one that has a rough approximation to top dead center, is utilized to select a certain crank angle span of digitization. When an encoder pulse corresponding to this pulse is identified the signal on line 44 is digitized over a predetermined crankshaft span or angle relative to the identified pulse which is inclusive of the top dead center position of the engine. This span of digitization is selected to exclude crankshaft positions in which either the engine intake or exhaust valve is open for the cylinder that is supplied with the microwave signal. This span includes portions of the engine compression and power strokes and of course includes the top dead center position of the piston.

When a certain span of the piston position related waveform 62 has been completely digitized and stored in the memory 46 this information is processed in order to determine the beginning 62C of the occurrence of the asymmetric waveform 62B caused by opening of the valve of fuel injection nozzle 58. Assuming first of all that the pulse on line 54 occurred at the top dead center position of the piston of the engine, due to mechanical location of top dead center in a manner described above, the encoder pulse that occurred at this position of the crankshaft is stored in the microprocessor. Knowing the encoder pulse that occurred at the top dead center position a pair of data windows 64 and 66 are utilized to scan the stored or recorded digital representation of the waveform 62. The data windows may be, for example each 10° wide in terms of crankshaft angle and are symmetrically disposed about top dead center such that the crankshaft angle between top dead center and the edge 66A of data window 66 is the same as the crankshaft angle between top dead center and the edge 64A of data window 64 in terms of encoder pulses which of course represent crankshaft angle. As mentioned, the data windows may be 10 crankshaft degrees wide and have edges 66B and 64B located at an equal number of crankshaft degrees from top dead center.

When using the processing method of FIG. 4 the data windows are initially spaced such that they both detect symmetrical portions of the waveform 62 as shown in FIG. 3. The data in the windows are now compared to determine the degree of correlation or correspondence. This can be accomplished, for example, in the manner disclosed in U.S. patent application Ser. No. 228,313, filed on Jan. 26, 1981 which is specifically incorporated herein by reference. Thus, in order to determine the degree of correlation between the data in windows 64 and 66 the digitized data stored in memory is processed in accordance with the flow diagram of FIG. 5.

For the purpose of explaining the correlation or comparison procedure let it be assumed that top dead center is at an encoder pulse count of 325, that the windows are separated by 150 pulses and that each window is 150 pulses wide. The stored digital values for an encoder signal pulse count a predetermined number of encoder signal pulse counts on one side of the selected encoder signal pulse count, count 325, and the stored digital value for the encoder signal pulse count the same number of encoder signal pulse counts on the other side of the selected encoder signal pulse count, count 325, are retrieved during the first step of the program. The stored digital value for encoder signal pulse count 100 that is 225 encoder signal pulse counts on one side of the selected encoder signal pulse count of 325, the width of window 64 in pulse counts plus one-half the space between windows 64 and 66 in pulse counts or 150 plus 75, and the stored digital value for encoder signal pulse count 550 that is 225 encoder signal pulse counts on the other side of the selected encoder signal pulse count of 325, the width of window 66 plus one-half the space between windows 64 and 66 in pulse counts or 150 plus 75, are the first values retrieved. At the beginning of the program as set forth in FIG. 5, at the initialization block 1, the quantity "E", the quantity "C" and the encoder pulse index "i" are all equal to zero. During block 2 of the program the replacement statement $i=i+1$ is completed by adding 1 to 0; the retrieved stored digital value for encoder signal pulse 100 ($A_1$) is multiplied by the retrieved stored digital value for encoder signal pulse 550 ($B_1$), $A_1 \times B_1$, and the retrieved stored digital values for encoder signal pulse counts 100 ($A_1$) and 550 ($B_1$) are each squared, $A_1^2$ and $B_1^2$. In block 3 of the program, the replacement statement $C=C+(A_i \times B_i)$ and the replacement statement $E=E+(A_i^2+B_i^2)$ are completed by adding the product $A_1 \times B_1$ to zero and by adding the sum of $A_1^2+B_1^2$ to zero. In the decision block 4 of the program, it is determined whether "i" of the replacement statement of block 2 is equal to "N" where "N" equals the number of encoder signal pulse counts to be selected from each of windows 64 and 66. As this is the first encoder signal pulse count processed, this answer is "no". Consequently, microprocessor unit 40 is programmed to revert to block number 2 where the replacement statement $i=i+1$ is completed. As "i" now equals 1, this replacement statement is completed by adding 1 to 1, the stored digital values for encoder signal pulse counts 101 and 549 are retrieved and multiplied by each other and each is separately squared in block number 2. In block 3 of the program, the replacement statement $C=C+(A_i \times B_i)$ and the replacement statement $E=E+(A_i^2+B_i^2)$ are completed by adding the product $A_2 \times B_2$ to the previous value for "C" and the sum $A_2^2+B_2^2$ to the previous value for "E". In the decision block 4 of the program, it is determined whether "i" of the replacement statement of block 2 is equal to "N". If the answer is no, microprocessor unit 40 is programmed to again go through the procedure hereinabove set forth for blocks 2, 3 and 4 until the value of "i" of decision block 4 equals "N". It will be appreciated that the block 3 operates to sum the products $A_i \times B_i$ for "N" steps and operates to sum the function $A_i^2+B_i^2$ for "N" steps and these separate summations are contained in separate registers. Therefore, one register will contain the sum of all of the individual $A_i \times B_i$ calculations and the other register will contain the sum of all of the individual $A_i^2+B_i^2$ calculations. When the value of "i" is equal to "N" in block 4, the program steps to the final block 5 in which the product of the aggregate sum of the multiplied retrieved digital values, the value "C" in block 3, multiplied by two is divided by the aggregate sum of the squared retrieved digital values, the value "E" in block 3. If this quotient, the normalized correlation value, is equal to or substantially equal to unity, the microprocessor unit 40 is programmed to shift the windows one encoder pulse count toward each other as is more fully described hereinafter in connection with FIG. 4. The crankshaft angle represented by the width of the windows remains constant but new data is now contained in the windows due to the shifting of the windows. Therefore, it can be seen that as long as the data contained in windows 64 and 66 is symmetric, the windows 64 and 66 are continuously shifted toward each other during each run of the computer until a window position is obtained wherein the data in windows 64 and 66 is not symmetric.

FIG. 4 illustrates a flow diagram executed by microprocessor 40 in accordance with a stored computer program for detecting the point of fuel injection relative to top dead center. As is evident from block 70 of FIG. 4 the data windows are placed symmetrically about top dead center. Further, they are located completely outside the asymmetrical portion 62B of the waveform. The encoder pulse count between the edge 64A to top dead center is now recorded in the microprocessor. The data windows 64 and 66 are moved toward each other by one encoder pulse at a time and during this procedure the data contained in the two windows is compared in a manner that has been described. In this regard, blocks 72 and 74 (FIG. 4) represent the function of the FIG. 5 flow diagram. As long as the data contained in the windows is symmetric the data windows are again shifted toward each other. This process continues until a comparison of the data contained within the windows indicates a asymmetric condition. Thus, in the example shown in FIG. 3, this will occur when the edge 64A of the data window 64 detects the beginning 62C of the asymmetric waveform 62B. Each time the data windows are shifted by one encoder pulse a counter or register within the microprocessor adds these counts until a asymmetric condition is detected. This count, when subtracted by the microprocessor from the total number of encoder pulses that was recorded between edge 64A and top dead center when windows 64 and 66 were initially placed about top dead center, represents the number of encoder pulses between the beginning 62C of the asymmetric waveform 62B and top dead center and therefore provides an indication of the crankshaft angle of fuel injection relative to top dead center. This can be converted to crankshaft degrees since the encoder pulses and crankshaft degrees have a fixed relationship.

Instead of placing the data windows initially in a symmetrical position, as shown in FIG. 3 and outside of a crankshaft angle where the asymmetric waveform 62B occurs, the data windows can be placed edge to edge at top dead center, that is where edges 64A and 66A would coincide with top dead center. The data windows are now moved outwardly away from top dead center by one sample position (encoder pulse) at a time and each time the data windows are moved a counter in the microprocessor is incremented. With this arrangement the data windows will initially detect asymmetric data since they will be detecting the asymmetric waveform 62B. As the windows are progressively moved outwardly they will eventually reach a position in which they both detect symmetric portions of the waveform 62. This will occur when edge 64A of window 64 reaches point 62C of the waveform. When this position is reached processing ceases and the count in the incremented counter is now indicative of the crank angle point of injection relative to top dead center. The procedure that has just been described is illustrated in the flow diagram of FIG. 6, it being understood that it utilizes the flow diagram of FIG. 5 for determining whether the data is similar or symmetric.

As previously mentioned, instead of mechanically determining top dead center via disk 48 and magnetic pickup 52, top dead center can be determined from the microwave signal reflected from the cylinder of the diesel engine in a manner disclosed in above-referenced patent application Ser. No. 228,313. In utilizing such a procedure the slot 50 and the disk 48 can be arranged such that it only gives a rough approximation of the top dead center position of the engine. The signal developed by pickup 52 and applied to line 54 is then utilized solely as a crankshaft position reference signal for determining where the span of digitization of the waveform should be located. In regard to this aspect of the invention, any other device that is capable of producing a signal that is a rough approximation of top dead center can be utilized as a reference signal for initial span digitization of the waveform.

Assuming now that a certain span of the reflected waveform disposed on either side of top dead center has been digitized and placed in memory, top dead center can be located by processing this signal in a manner to now be described. Thus, in determining top dead center an encoder pulse occurring prior to top dead center is selected and the windows are placed equadistant from this encoder pulse and on both sides thereof. The microprocessor is programmed such that the windows are now shifted together in the same direction relative to the waveform of FIG. 3 and the data contained in the windows is compared in a manner shown in FIG. 5. This procedure continues until substantial correlation or correspondence exists between the data contained within the windows indicative of waveform symmetry. When this occurs the encoder pulse located midway edges 64A and 66A of the windows corresponds to the top dead center position of the piston and corresponds to a certain encoder pulse count that can be identified relative to a reference encoder pulse. When using this microwave procedure to determine top dead center the spacing between the edges 64A and 66A of the windows must be located outboard of the asymmetric portion 62B of the waveform when the windows finally are receiving symmetric data indicating top dead center. Putting it another way, the spacing between edges 64A and 66A of the windows must be such that they do not detect the asymmetric waveform 62B when they are finally shifted to a position indicative of top dead center.

Having determined the encoder pulse count corresponding to top dead center by the microwave method that has just been described, the windows 64 and 66 can now be placed and then shifted in accordance with the flow diagram of either FIG. 4 or FIG. 6 in order to detect the point of fuel injection relative to the top dead center position of the engine. This can be accomplished by a programmed digital processing procedure or method in which top dead center is located by data window processing of the reflected microwave signal as described above and the point of fuel injection is then determined by the execution of the flow diagram of FIG. 4 or FIG. 6.

It will, of course, be appreciated by those skilled in the art that once the timing angle of fuel injection, relative to top dead center has been determined in terms of encoder pulse counts by the microprocessor, it can apply an output to output device 76. This device 76 can be, for example, a digital readout device that displays injection timing angle in crankshaft degrees. Thus, the encoder pulse count can, in a known manner, be converted to crankshaft angle degrees since the space between consecutive encoder pulses represents a certain crankshaft angle in degrees. Further, the output from microprocessor 40 can be utilized to set injection timing to some desired value. Thus, knowing the actual injection timing angle and the desired timing angle the pump 12 can be adjusted until actual timing corresponds to desired timing.

As has been described, the flow diagram of FIG. 5 serves to compare the data contained in windows 64 and 66 to determine the degree of correspondence or correlation between the data contained therein. When there is substantial correspondence or correlation the data being detected by the windows represents symmetric data, that is the portions of the waveform 62 being detected are symmetric about a point located midway the windows. As explained, in connection with FIG. 5, the first pair of data values processed by the windows are those corresponding to encoder pulses located respectively just inward of data window edges 64B and 66B. The data processing then proceeds to process pairs of encoder pulses (one from each window) in a direction from edge 64B to edge 64A and from edge 66B toward edge 66A until all of the encoder pulses in a window have been processed. This has the effect of determining the degree of symmetry between portions of the wave form being processed by the data windows.

The waveform 62 is a generalized waveform to illustrate the effect of poppet valve opening and piston motion. It can take various shapes, depending upon, among other things, the frequency of the microwave source 18.

The microprocessor 40 has been illustrated as including a signal digitizer and memory. The signal digitizer can take the form of a conventional sample and hold circuit the output of which is connected to an analog to digital converter. The microprocessor system 40 includes the usual central processing unit, address, data and control busses, counters and registers and memory devices so as to provide a digital computer system that is programmed in a manner described above.

The embodiments of the invention in which an exclusive property or privilege is claimed are defined as follows:

1. A method of determining the crankshaft angle at which a poppet type fuel injector of a diesel engine opens to inject fuel into the combustion chamber of the engine relative to the top dead center position of the piston of the engine, the steps of comprising, while the engine is running supplying a microwave signal to the combustion chamber thereof and detecting the reflected waveform, the frequency of the microwave signal being such that the amplitude of the detected reflected waveform is a function of engine crank angle, has portions that are substantially symmetrical about top dead center over crankshaft angles located outboard of top dead center and has an asymmetric portion due to injector poppet opening movement located between the symmetrical portions, sampling the amplitude of the reflected waveform by two data windows that are spaced sufficiently as to exclude the asymmetric portion of the waveform when the windows are centered about top dead center, shifting the windows until the data sampled by the windows is substantially symmetrical thereby identifying a crankshaft position corresponding to top dead center, placing the windows in a position in which they are centered about top dead center to detect predetermined portions of the waveform which may include asymmetrical data, and then varying the space between the windows until the windows detect a transition from asymmetric to asymmetric data or vice versa thereby identifying the crank angle at which the injector poppet opened.

2. A method of determining the crankshaft angle at which the poppet injector of a diesel engine opens to inject fuel into the combustion chamber of the engine relative to the top dead center position of the piston of the engine, the steps comprising, while the engine is running supplying a microwave signal to the combustion chamber thereof and detecting the reflected waveform, the frequency of the microwave signal being such that the amplitude of the detected reflected waveform is a function of engine crank angle, has portions that are substantially symmetrical about top dead center over crankshaft angles located outboard of top dead center and has an asymmetric portion due to injector poppet opening movement located between the symmetrical portions, developing and recording data that is comprised of the magnitude of the reflected waveform at each of a plurality of crankshaft positions, sampling the recorded data by shifting data sampling window means from a reference position that has a predetermined relationship to engine top dead center to a second position wherein the data sampling window means detects a transition from symmetric to asymmetric data or vice versa, and determining the extent of movement of said data sampling window means between said reference position and said second position.

3. A method of determining the crankshaft angle at which the poppet injector of a diesel engine opens to inject fuel into the combustion chamber of the engine relative to the top dead center position of the piston of the engine, the steps comprising, while the engine is running supplying a microwave signal to the combustion chamber thereof and detecting the reflected waveform, the frequency of the microwave signal being such that the magnitude of the detected reflected waveform is a function of engine crank angle, has portions that are substantially symmetrical about top dead center over crankshaft angles located outboard of top dead center and has an asymmetric portion due to injector poppet opening movement located between the symmetrical portions, developing and recording data that is comprised of the magnitude of the reflected waveform at each of a plurality of crankshaft positions, sampling the recorded data by two data windows that are spaced sufficiently as to exclude the asymmetric portion of the wave form when the windows are centered about top dead center, shifting the windows until the data sampled by the windows is indicative of waveform symmetry thereby identifying a crankshaft position corresponding to top dead center, placing the windows in a position in which they are centered about top dead center to detect predetermined portions of the waveform which may include asymmetrical data, and varying the space between the windows until the windows detect a transition from symmetric to asymmetric data or vice versa thereby identifying the crank angle at which the injector poppet opened.

4. A method of determining the crankshaft angle at which the poppet injector of a diesel engine opens to inject fuel into the combustion chamber of the engine relative to the top dead center position of the piston of the engine, the steps comprising, while the engine is running supplying a microwave signal to the combustion chamber thereof and detecting the reflected waveform, the frequency of the microwave signal being such that the amplitude of the reflected waveform is a function of engine crank angle, has portions that are substantially symmetrical about top dead center over crankshaft angles located outboard of top dead center and has an asymmetric portion due to injector poppet opening movement located between the symmetrical portions, developing and recording data that is comprised of the magnitude of the reflected waveform at each of a plurality of crankshaft positions, developing data indicative of the top dead center position of the crankshaft of the engine, sampling the recorded data by placing two data windows in a position in which they are centered about the top dead center data position to detect predetermined portions of the waveform which may include asymmetrical data, and varying the space between the windows until the windows detect a transition from symmetric to asymmetric data or vice versa thereby identifying the crank angle at which the injector poppet opened.

5. A method of determining the crankshaft angle at which the poppet injector of a diesel engine opens to inject fuel into the combustion chamber of the engine relative to the top dead center position of the piston of the engine, the steps comprising, while the engine is running supplying a microwave signal to the combustion chamber thereof and detecting the reflected waveform, the frequency of the microwave signal being such that the amplitude of the reflected waveform is a function of engine crank angle, has portions that are substantially symmetrical about top dead center over crankshaft angles located outboard of top dead center and has an asymmetric portion due to injector poppet opening movement located between the symmetrical portions, developing and recording data that is comprised of the magnitude of the reflected waveform at each of a plurality of crankshaft positions, developing data indicative of the top dead center position of the crankshaft of the engine, sampling the recorded data by placing two data windows in a position in which their adjoining edges substantially coincide with the top dead center data position to detect predetermined portions of the waveform which include asymmetrical data, and shifting the windows away from the top dead center data position until the windows detect a transition from asymmetric to symmetric data thereby identifying the crank angle at which the injector poppet opened.

6. Apparatus for determining the crankshaft angle at which the poppet injector of a diesel engine opens to inject fuel into the combustion chamber of the engine relative to the top dead center position of the piston of the engine comprising, means for supplying a microwave signal to the combustion chamber thereof while the engine is running and detecting the reflected waveform, the frequency of the microwave signal being such that the amplitude of the detected reflected waveform is a function of engine crank angle, has portions that are substantially symmetrical about top dead center over crankshaft angles located outboard of top dead center and has an asymmetric portion due to injector poppet opening movement located between the symmetrical portions, means coupled to the crankshaft of the engine for developing a series of electrical position pulses related to crankshaft position, means for recording data in synchronism with the occurrence of certain of said position pulses related to the magnitude of the reflected waveform when a position pulse occurs, and data processing means for sampling the recorded data by two data windows that are spaced sufficiently as to exclude the asymmetric portion of the waveform when the windows are centered about top dead center, said data processing means operative to (1) shift the windows until the data sampled by the windows is substantially symmetrical thereby identifying a crankshaft position corresponding to top dead center, (2) place the windows in a position in which they are centered about top dead center to detect predetermined portions of the waveform which may include asymmetrical data, and (3) vary the space between the windows until the windows detect a transition from symmetric to asymmetric data or vice versa thereby identifying the crank angle at which the injector poppet opened.

* * * * *